350-377
SR
XR 3,171,754
CROSS REFERENCE SEARCH ROOM
TX4030W

March 2, 1965 P. SMALLER 3,171,754

MAGNETIC STORAGE MEDIUM FOR MAGNETO-OPTICAL READOUT

Filed Jan. 30, 1961

PHILIP SMALLER
INVENTOR.
BY Nathan N. Kallman
ATTORNEY

3171754
OR IN 428/336

United States Patent Office 3,171,754
Patented Mar. 2, 1965

3,171,754
MAGNETIC STORAGE MEDIUM FOR MAGNETO-OPTICAL READOUT

Philip Smaller, Portola Valley, Calif., assignor to Ampex Corporation, Redwood City, Calif., a corporation of California Filed Jan. 30, 1961, Ser. No. 85,634
3 Claims. (Cl. 117—71)

This invention relates to magnetic recording and reproducing, and in particular to a novel magnetic storage medium that affords high speed optical readout of recorded information.

In presently known systems, information that is stored on a magnetic medium, such as a conventional magnetic tape, is generally reproduced as electrical or electronic information. However, in many instances it would be desirable to provide a substantially direct optical readout of such stored information. With presently known storage mediums and reproducing systems, it is not feasible to read out the recorded information directly by optical means.

An object of this invention is to provide a novel magnetic storage medium.

Another object of this invention is to provide a storage medium and reproducing system which affords quick optical readout of recorded information.

In accordance with this invention, a magnetic storage medium comprises a transparent support or substrate on which a very thin film of ferromagnetic material having low coercivity is deposited. A thin layer of magnetic oxide having relatively high coercivity is deposited coextensively upon the thin ferromagnetic film.

When an information signal is recorded on the oxide layer in the form of a magnetic flux pattern, by well-known means, the recorded flux fields representing the information signal causes a similar magnetic pattern to appear on the low coercivity ferromagnetic film that is disposed closely adjacent to the oxide film.

With the information then stored on the very thin film in the form of magnetization, a magneto-optical system employing either the magneto-optical Faraday or Kerr effect may be utilized to read out the stored data. For this purpose, a linearly polarized radiation beam is directed toward the very thin film such that the optical axis of one beam is rotated in accordance with the magnetic intensity encountered as the beam scans the magnetic pattern registered on the very thin film. The degree of rotation determines the intensity of the radiation that is transmitted to a photodetection means. The photodetection means may comprise an analyzer and a photomultiplier, which provide an optical readout of the stored information.

The invention will be described in greater detail with respect to the drawing in which.

Figure 1:
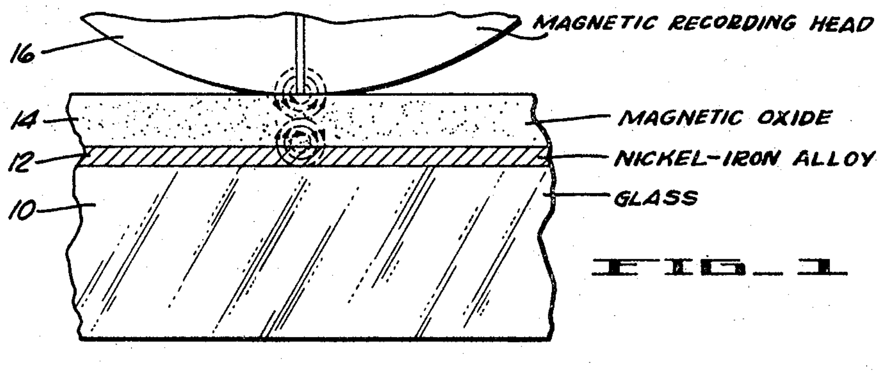
FIGURE 1 shows a magnetic storage medium, in accordance with the invention, the various layers not being in proportion for the purpose of convenience.

In FIGURE 1, a storage medium comprises a transparent support or substrate 10, which may be glass for example, or any transparent medium which does not influence the polarized light, upon which is deposited a very thin film of a ferromagnetic material 12. The film of ferromagnetic material 12, which may be Permalloy (80% Ni and 20% Fe) for example, may be deposited by means of evaporation in a wel-known manner. A relatively thicker layer of magnetic oxide 14, such as gamma ferric oxide dispersed in a binder which is a combination widely used with known magnetic tapes, is applied to the very thin film 12 to complete the structure of the storage medium, according to this invention. The layer of magnetic oxide 14 may be about .0005 inch or 12.7 microns thick having a coercivity of about 250 oersteds, whereas the very thin film 12 is preferably less than one micron in thickness and has a coercivity of approximately 1–10 oersteds. A typical magnetic oxide and a typical method of manufacturing a magnetic tape are disclosed in U.S. Patent 2,694,656, issued on November 16, 1954, to M. Camras and U.S. Patent 2,796,359, issued on June 18, 1957, to W. C. Speed.

During recording, signal information, which is processed through conventional magnetic tape electronics, is transduced by means of a magnetic recording head 16 (partially shown) that is disposed adjacent to the oxide layer 14 of the storage medium. In this manner, the information is registered in the form of a magnetic flux pattern and stored on the oxide layer 14. However, because the adjacent very thin film 12 has relatively low coercivity, the stored information in the form of magnetic flux magnetizes the ferromagnetic film 12 so that a flux pattern is developed on the thin film 12 corresponding to the pattern on the magnetic oxide layer 14.

Figures 2, 3:
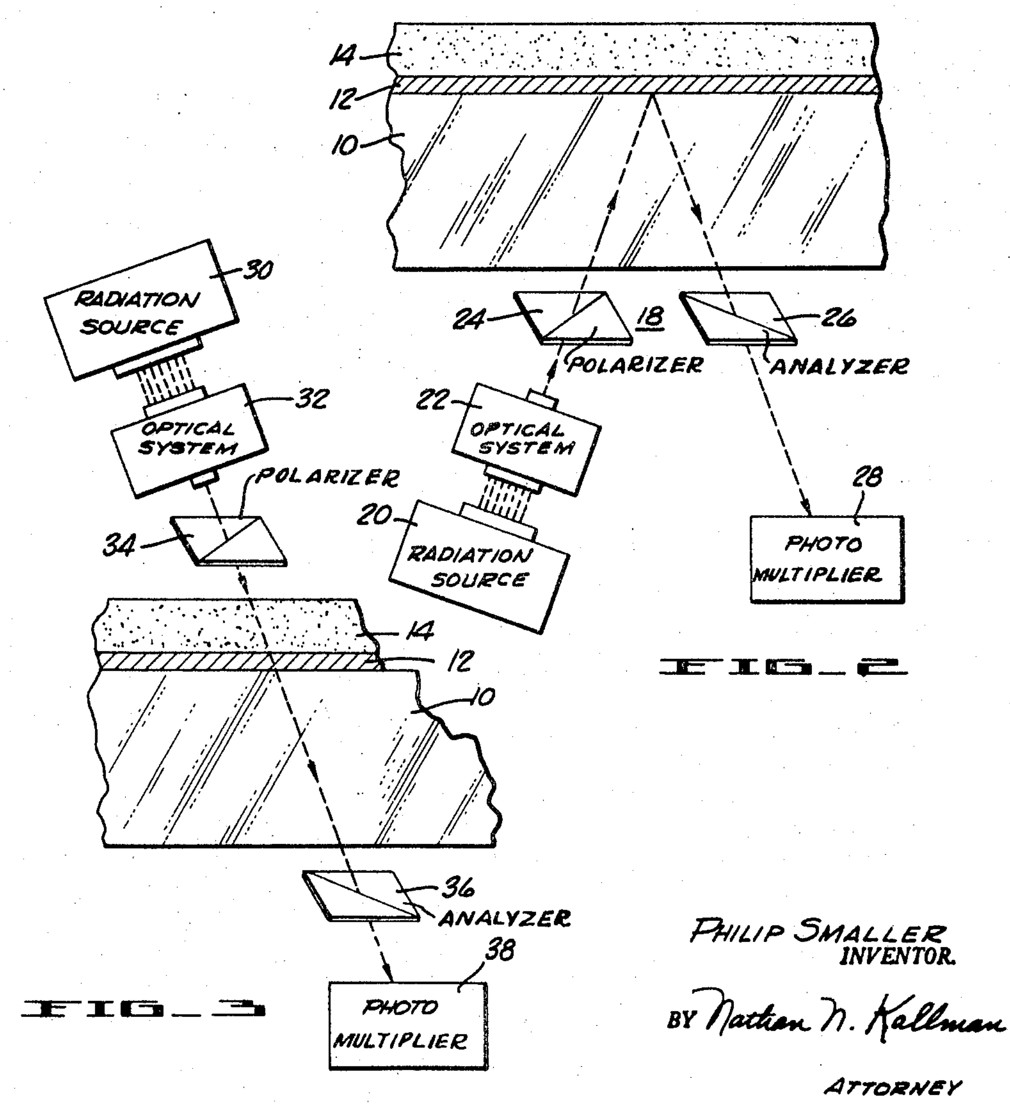
FIGURE 2 shows a magneto-optical readout system that may be used with the storage medium of the invention.
FIGURE 3 shows an alternative magneto-optical system for use with the storage medium.

To quickly read out the stored information, which appears in the form of varying magnetization, a magneto-optical readout system 18 employing the magneto-optical Kerr effect such as shown in FIGURE 2 may be utilized. The magneto-optical readout means 18 includes a light beam source 20, which may comprise an incandescent light bulb for example, that provides radiation to optical focusing apparatus 22. The focused light radiation is then transmitted through a polarizer 24, such as Nicol prism, or a Polaroid sheet, to provide a linear or plane polarized light beam at its output. The polarized light beam, in which the electrical vectors of the beam components lie in the same fixed plane, is then directed through the transparent support 10 and impinges on the very thin ferromagnetic film 12 having the stored information in the form of magnetic flux.

The surface of the glass support 10 adjacent to the ferromagnetic film 12 is highly polished such that a good reflecting surface is provided at the abutment of the ferromagnetic film 12 and the glass 10. Thus, the polarized light beam impinges on the very thin film 12 and is reflected through the glass support 10 to a polarization filter 26 that is complementary to the polarizer 24. The filter 26, which may also be a Nicol prism or a Polaroid sheet, serves as an analyzer, and is arranged in this particular embodiment so that at those elemental areas where the film 12 is not magnetized, the reflected polarized light beam is substantially absorbed by the analyzer 26. On the other hand, if the area being read out has an increased magnetization caused by recorded signal information, more light is transmitted through the analyzer 26. A photomultiplier 28 may then be used to detect the modulated light radiation that represents the original signal information and its variations. Scanning of the storage medium may be achieved by moving the medium relative to the readout system, or by other known suitable means.

In FIGURE 3, an alternative magneto-optical means utilizes the magneto-optical Faraday effect wherein radiation is transmitted through the storage medium including the oxide layer 14 for modulation by the magnetized thin film 12 and subsequent photodetection. However, since the oxide film 14 is not transparent to visible light, radiation in the infrared spectrum is used for penetrating the oxide layer 14 and for passage through the thin film 12 and glass support 10.

Thus, a source of infrared energy 30 provides radiation to an optical focusing apparatus 32, which concentrates the radiation in a beam that is directed to a polarizer 34. The beam is then polarized in a similar manner as described with reference to FIGURE 2. The polarized beam is applied to the thin magnetic film 12 through the oxide layer 14, and is modulated in accordance with the magnetic pattern on the film 12 as the beam scans the film 12. The modulated beam passes through the glass support 10 to an analyzer 36 and photomultiplier 38, similar to the previously-described combination 26, 28, to provide a read of the recorded signal information, as explained heretofore with relation to FIGURE 2.

A feature of this invention is that the use of magnetic reproduce heads is not required for reproducing the signal information. Presently known reproduce heads are subject to wear and deformation, and the operating life of such heads is relatively short. On the other hand, the optical system proposed for use with the magnetic storage medium of this invention is not subject to deterioration or undesirable physical changes. Furthermore, the storage medium of this invention affords high speed optical readout when so desired.

It is understood that the invention is not limited to the particular storage medium structure shown in the drawing, nor to the particular optical system utilized for reproducing the information signal. For example, a ferro-magnetic film having a high coercive force may be used in lieu of the magnetic oxide. It is not necessary that the film of high coercivity have good magneto-optical characteristics, because only the low coercive force film is utilized for the magneto-optical readout. Also, various arrangements of polarizers and analyzers may be used to detect the magnetization registered on the thin film of low coercivity.

What is claimed is:

1. A magnetic storage medium for recording information that may be read out magneto-optically comprising: a glass substrate for transmitting light without influencing polarization; a film of ferromagnetic material having a coercivity of 1–10 oersteds and a thickness of less than about 2 microns deposited on said support; and a thin layer of magnetic oxide dispersed in a binder having a coercivity in the region of 250 oersteds and a thickness of less than about 25 microns superimposed coextensively on said film.

2. The structure defined in claim 1 wherein said ferromagnetic material comprises an alloy having approximately 80% nickel and 20% iron and said magnetic oxide comprises a gamma ferric oxide.

3. The structure defined in claim 1 wherein said film is approximately 1 micron and said thin layer of magnetic oxide is approximately 12 microns.

References Cited by the Examiner

UNITED STATES PATENTS

| | | | |
|---|---|---|---|
| 2,643,130 | 6/53 | Kornei | 117—71 |
| 2,647,954 | 8/53 | Howell. | |
| 2,691,072 | 10/54 | Mathes. | |
| 2,941,901 | 6/60 | Prill et al. | |
| 3,052,567 | 9/62 | Gabor et al. | 117—71 |
| 3,055,770 | 9/62 | Sankuer et al. | |
| 3,076,727 | 2/63 | Harwig | 117—71 XR |
| 3,100,158 | 8/63 | Lemaire et al. | 117—124 |
| 3,102,048 | 8/63 | Gran et al. | 117—124 |

OTHER REFERENCES

Hart: "Magneto-Optic Hysteresigraph," IBM Technical Disclosure Bulletin, vol. 1, No. 5, February 1959, 340–173 Light.

Hagopian et al.: "Magneto-Optical Recording System," IBM Technical Disclosure Bulletin, vol. 3, No. 3, August 1960, 340–173 Light.

RICHARD D. NEVIUS, *Primary Examiner.*

MURRAY KATZ, *Examiner.*